United States Patent [19]
Auborn et al.

[11] 3,923,543
[45] Dec. 2, 1975

[54] ELECTROCHEMICAL CELL

[75] Inventors: James J. Auborn, Groton; Sheldon I. Lieberman, Burlington, Mass.

[73] Assignee: GTE Laboratories Incorporated, Waltham, Mass.

[22] Filed: Oct. 24, 1974

[21] Appl. No.: 517,557

Related U.S. Application Data

[63] Continuation of Ser. No. 305,796, Nov. 13, 1972, abandoned.

[52] U.S. Cl. .......... 136/6 LN; 136/100 R; 136/155
[51] Int. Cl. ......................................... H01m 35/00
[58] Field of Search ......... 136/6 LN, 100, 83, 154, 136/155

[56] References Cited
UNITED STATES PATENTS

| | | | |
|---|---|---|---|
| 3,423,242 | 1/1969 | Meyers et al. | 136/6 LN |
| 3,567,515 | 3/1971 | Maricle et al. | 136/6 LN |
| 3,573,105 | 3/1971 | Weininger et al. | 138/86 A |
| 3,578,500 | 5/1971 | Maricle et al. | 136/6 LN |
| 3,639,174 | 2/1972 | Kezelman | 136/6 LN X |

*Primary Examiner*—John H. Mack
*Assistant Examiner*—C. F. Lefevour
*Attorney, Agent, or Firm*—Irving M. Kriegsman

[57] ABSTRACT

An electrochemical cell having an alkali metal anode, a cathode including as the active cathode material an intercalation compound of graphite and fluorine of the general formula $(C_4F)_n$ wherein n refers to the presence of a large, but indefinite, number of recurring ($C_4F$) groups in the intercalation compound; and an electrolyte containing an inorganic solvent selected from the group consisting of phosphorus oxychloride, monofluorophosphoryl dichloride, thionyl chloride, sulfuryl chloride, and mixtures thereof, and a solute dissolved in the inorganic solvent material. Of particular interest are those cells which have a Lewis acid, or an excess of a Lewis acid, present in the electrolyte either by actual addition or by dissociation. A unique feature of such cells is that the cathode material will catalyze the electrochemical decomposition of the solvent resulting, quite unexpectedly, in a cell having a coulombic cathode utilization efficiency greater than 100% of the theoretical attainable according to reduction of the active cathode material.

24 Claims, No Drawings

ELECTROCHEMICAL CELL

The invention herein described was made in the course of or under a contract or subcontract thereunder with the U.S. Government.

REFERENCE TO PARENT APPLICATION

This application is a continuation of application Ser. No. 305,796, filed Nov. 13, 1972 now abandoned.

BACKGROUND OF THE INVENTION

This invention relates to electrochemical cells. More particularly, it relates to electrochemical cells having an alkali metal anode, a cathode including, at least in part, an intercalation compound of graphite and fluorine represented by the general formula $(C_4F)n$ as the active cathode material, and an electrolyte therebetween having an inorganic solvent material and a solute material dissolved therein.

Modern technology has placed increased emphasis on producing an electrochemical power source having improved reliability, light weight, high power and long life. Power sources meeting these requirements find ready military applications in communications, submarines, torpedoes and missile operations. In addition to its significance in defense, a light weight, high power, reliable power source would be a great value for use, for example with portable radios or television sets.

Various high-voltage, high energy density electrochemical cells have been the subject of recent investigation. Much of the work in this area has been involved with electrochemical cells having negative electrodes comprising highly reactive metals such as lithium.

Work on electrolytes for lithium-based electrochemical power sources has progressed generally along two major lines: high temperature molten salt electrolytes and organic solvent electrolytes. A cell which utilizes a molten salt electrolyte provides a chemically stable system in which strong oxidents such as chlorine can be used as cathodes. A cell utilizing a lithium anode and chlorine cathode provides exceptionally high energy and power density making development of a practical cell with these materials of particular interest. The molten salt lithium/chlorine cell (having a lithium anode, chlorine cathode and molten salt, typically lithium chloride, electrolyte) has many characteristics desirable in a high performance electrochemical cell. The anode is highly electropositive, and the cathode is highly electronegative. The equivalent weight of the reaction product is low and the anode, cathode and electrolyte conductivities are high. Nevertheless, these cells have severe problems. The temperature range of operation, which for the lithium chloride electrolyte is 450°C to 650°C, necessitates heating systems and insulation that increases its cost, weight and complexity. To collect and store the chlorine evolved in rechargeable cells at these high temperatures, auxiliary systems are needed. In addition, there are few materials that can withstand for extended periods the attack of molten lithium, chlorine and molten lithium chloride at these temperatures; therefore the operating lifetime of these cells is relatively short, typically 20 to 30 minutes. The measured open circuit voltage, typically about 3.5 volts, is below the approximately 4 volts which is theoretically obtainable at 25°C.

In parallel with the development of lithium cells with molten salt electrolytes, lithium cells with nonhydroxylic organic solvents have been developed. These cells have been called "organic electrolyte cells" although typically they employ electrolytes consisting of inorganic salts in organic solvents. Cells of this type have the advantage of being operable at room temperature; however, chlorine itself and other strong oxidants cannot be used as a cathode with these solvents since the solvents are oxidized. Therefore, cells of this type will not provide an energy density as high as a lithium chlorine cell.

In application Ser. No. 131,530 filed Apr. 5, 1971 now abandoned, there is described an improved electrochemical cell having an anode selected from a specific group of materials, including the alkali metals, a halogen or metal halide cathode, and an electrolyte containing the inorganic material phosphorus oxychloride as the solvent and a solute, selected from a wide range of materials, dissolved in the solvent material.

The present invention is related to the invention described in the aforementioned application in that the same anodic and electrolyte materials can be utilized in the present invention; however, this invention relates to the use of such materials with a known cathode material (See U.S. Pat. No. 3,514,337), which, quite unexpectedly, yields electrochemical cells having coulombic cathode utilization efficiencies greater than 100% of the theoretical expected to be attained according to the reduction of the active cathode material.

SUMMARY OF THE INVENTION

This invention provides an electrochemical cell having an alkali metal anode, a cathode including, at least in part, an intercalation compound of graphite and fluorine represented by the general formula $(C_4F)n$ as the active cathode material, wherein n refers to the presence of a large, but undetermined numbr of recurring $(C_4F)$ groups in the intercalation compound and an electrolyte containing an inorganic solvent material selected from the group consisting of phosphorus oxychloride, monofluorophosphoryl dichloride, thionyl chloride, sulfuryl chloride, and mixtures thereof, and a solute selected from a wide range of materials dissolved in the inorganic solvent material. It has been found, quite unexpectedly, that when the solute contains a quantity of a Lewis acid, either by actual addition of such material or by dissociation of a solute that will provide such a material, the cathode material will catalyze the electrochemical decomposition of the inorganic solvent material thereby resulting in a cell having a coulombic cathode utilization efficiency greater than 100% of the theoretical which would be attained according to reduction of the active cathode material to elemental carbon and fluoride ion. The additional energy attained is attributable to the catalytic decomposition of the inorganic solvent material during discharge of the cell, thereby enabling the otherwise "dead" weight of the electrolyte solvent to be utilized as an energy source.

With phosphorus oxychloride as the inorganic solvent material the active cathode material as described above becomes depleted when discharged against lithium, and cannot be used over again although fresh lithium and inorganic solvent are added. In fact, upon examination it has been found that the expended cathodes "swell" to about twice their original thickness. Notwithstanding these particular operating characteristics, which prevent the electrochemical cells of the present invention from being rechargeable, the invention can be extended to include fuel cells by providing fresh anode, cathode and electrolyte materials as the old materials are continuously utilized or otherwise depleted.

The cells of the present invention have been allowed to stand filled with the electrolyte solution for several days before discharge without adversely affecting performance. In addition, discharge of the cells of the present invention have been interrupted for periods ranging from two to three days before resumption, again without decreasing the preformance characteristics of the cells. It thus appears that the catalytic electrochemical decomposition of the solvent material does not occur spontaneously, but requires electron transfer through an external circuit to the $(C_4F)n$ electrode where the inorganic solvent is reduced. This characteristic enables the cells of the present invention to be stored for a long period of time, and then used intermittently without adverse effects on cell performance or performance characteristics, during periods of non-use.

The presently preferred active cathode material suitable for use in the present invention is the intercalation compound of graphite and fluorine having the formula $(C_4F)n$, where n is as defined above, for example, as shown in U.S. Pat. No. 3,514,337. $(C_4F)n$ is commercially available under the designation fluorographite-B from Ozark-Mahoning Company. The actual cathode can be prepared by pressing a blend of the active cathode material (typically 80–90%) with 10–20% of a conducting material (usually graphite) and a sufficient quantity of a binder material, for example polyethylene or polytetrafluoroethylene) onto a metallic grid, for example, an expanded copper or nickel screen, at a pressure of, for example, 2,000 pounds per square inch for three minutes.

The $(C_4F)n$ active cathode material can be utilized in combination with graphite, carbon black, or $(CF)n$ to achieve cathode utilization efficiencies greater than 100%. When admixed with $(CF)n$ the intercalation compound (ie: the active cathode material) will have an average or representative formula $(C_xF)n$, where $x$ is greater than 1 and less than 4. Such intercalation compounds are considered mixtures of $(C_4F)n$ and $(CF)n$ in the proportions which give the particular value of $x$. The intercalation compounds having the formula $(C_4F)n$ are presently preferred, however, since greater cathode utilization efficiencies can, in general, be attained therewith. That is, as $x$ increases from 1 to 4, the intercalation compounds contain greater percentages of $(C_4F)n$ as the active cathode component, and, in combination with the other components of the cells of this invention, yield, in general, progressively greater cathode utilization efficiencies.

The anode is an active material and is preferrably lithium metal. Other materials for anodes contemplated for use in this invention include sodium and potassium. The anode may be constructed of the active material in contact with a metal grid. The grid for such an anode, for example, may be made of nickel, nickel alloys (sugh a monel), stainless steel, silver and platinum.

As used throughout this specification and claims, when an electrochemical cell is designated to have a particular anode or cathode, or to be made of a particular anode or cathode material, that anode or cathode, or anode or cathode material, shall mean the electrochemically active component of the anode or cathode structure. The electrochemically active component may be in contact with, or form a part of, a suitable substrate which further defines the total anode or cathode structure.

As indicated above, the electrolyte has an inorganic solvent material selected from the group consisting of phosphorus oxychloride, monofluorophosphoryl dichloride, thionyl chloride, sulfuryl chloride, and mixtures thereof. It is preferred that the inorganic solvent material be dried prior to use. In the case of phosphorus oxychloride, for example, this is accomplished by boiling this solvent material with clean lithium shot for twelve hours at room temperature under an argon atmosphere. The solvent is then distilled at atmospheric pressure and the material which boils between 105°C and 106°C is collected. The solvent thus prepared has a specific conductance of less than $7 \times 10^{-7}$ Mhos/cm. Other suitable techniques and drying techniques for the other solvent materials are described in the published literature or will be apparent to those skilled in this art.

In general, the solvents utilized in the cells of the present invention are thermodynamically stable relative to their constituent elements, differing in this respect from known prior art cells utilizing organic solvents. Because of their stability, the solvents do not irreversibly decompose when the cells are charged at substantial overpotentials. In $POCl_3$, for example, charging overpotentials result in formation of trivalent phosphorus compounds and dissolved chlorine. These recombine to give the solvent. This opens the way to the first readily rechargable lithium cells which operate at ambient temperatures and atmosphere pressure. It should be noted, however, that the only solvent listed above which is thermodynamically unstable is $POFCl_2$.

The typical solute which is dissolved in the solvent material provides at least one anion of the general formula $MX_4^-$, $M'X_6^=$, and $M''X_6^=$, where M is an element selected from the group consisting of boron and aluminum; M' is an element selected from the group consisting of phosphorus, arsenic, and antimony; M'' is an element selected from the group consisting of tin, zirconium and titanium; and X is a halogen. Examples of suitable solutes yielding anions $MX_4^-$ are: tetrachloroaluminates ($AlCl_4^-$), tetrabromoaluminates ($AlBr_4^-$), tetrachloroborates ($BCl_4^-$), and tetrafluoroborates ($BF_4^-$). Examples of solutes yielding anions $M'X_6^-$ are: hexafluorophosphates ($PF_6^-$), hexafluoroarsenates ($AsF_6^-$), hexafluoroantimonates ($SbF_6^-$) and hexachloroantimonates ($SbCl_6^-$). Examples of solutes yielding anions $M''X_6^=$ are: hexachlorostannates ($SnCl_6^=$), hexachlorozirconates ($ZrCl_6^=$) and hexachlorotitanates ($TiCl_6^=$). However solutes yielding a halogen anion, particularly chlorides ($Cl^-$), bromides ($Br^-$), and iodides ($I^-$), and solutes providing one of the anions dichloroiodates ($ICl_2^-$), bound adducts of dichlorophosphates and Lewis acids (such as $ZrCl_4$, $AlCl_3$, $BCl_3$, etc.), perchlorates ($ClO_4^-$) and chlorosulfate ($SO_3Cl^-$) are also contemplated within the scope of this invention.

The solute also provides at least one cation. This cation may be an alkali metal, especially lithium, sodium, potassium, cesium, rubidium; and alkali earth metal, especially magnesium, calcium, strontium, and barium; or a lanthanide rare earth element, especially lanthanum, terbium, neodymium, cerium, europium and samarium. Cations having the following general formula $R_4N^+$ where R is a radical selected from the group consisting of methyl, ethyl, propyl, isopropyl, butyl and isobutyl are also contemplated to be suitable for use in this invention. Examples of suitable cations are: tetramethylammonium $(CH_3)_4^+$, tetraethylammonium $(C_2H_5)_4N^+$, tetrapropylammonium $(C_3H_7)_4N^+$, and tetrabutylammonium $(C_4H_9)_4N^+$. These cations may be added as the tetraalkylammonium chloride, for example. Another cation contemplated within the scope of this invention is phosphorus oxydichloride ($POCl_2^+$). The solute for a particular cell can be chosen to yield a combination of any of the anions and cations listed above, however, the electrolyte must contain at least $10^{-3}$ moles per liter of cation and at least $10^{-3}$ moles per liter of anion. Preferably, at least $10^{-1}$ moles per liter of cation and at least $10^{-1}$ moles per liter of anion are present.

Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexaflurophosphate, lithium hexafluoroarsenate, lithium hexafluoroantimonate, lithium hexachloroantimonate, lithium hexachlorostannate, lithium hexachlorozirconate, lithium hexachlorotitanate and lithium chlorosulfate. Other preferred compounds are Lewis acids; particularly aluminum chloride $AlCl_3$), boron fluoride ($BF_3$), tin chloride ($SnCl_4$), antimony chloride ($SbCl_5$), antimony fluoride ($SbF_5$), titanium chloride ($TiCl_4$), aluminum bromide ($AlBr_3$), phosphorus fluoride ($PF_5$), phosphorus pentachloride ($PCl_5$), arsenic pentafluoride ($AsF_5$), arsenic pentachloride ($AsCl_5$), zinc chloride ($ZnCl_2$) and zirconium chloride ($ZrCl_4$).

To achieve the greater than 100% coulombic cathode utilization efficiency with the $(C_4F)n$ active cathode component, it is necessary that the solute contain a Lewis acid, either by direct addition of a Lewis acid to the electrolyte, or by the dissociation of a solute which will, during such dissociation, provide the requisite Lewis acid material. For example, solute materials which will provide the requisite Lewis acid include lithium tetrachloroborate, lithium tetrafluoroborate and lithium tetrachloroaluminate. If desired, excess Lewis acid material can be provided over and above that which would be attained by dissociation of a Lewis acid-yielding solute material.

A suitable mechanical separator can be used to separate the two electrodes. A wide variety of ceramic and plastic materials having small pore sizes are available. Examples of such materials include: alumina, beryllia, magnesia, zirconia, titania, porcelain, porous glass, fritted glass, nonwoven porous polytetrafluoroethylene and other fluorinated polymers, polypropylene, polyethylene, and glass fibers.

The case for the cells of this invention can be, for example, fabricated from stainless steel (such as stainless steel 304 or 316), nickel, or nickel clad steel.

The cells of the present invention exhibit, upon discharge, a sharp but short drop in voltage from their open circuit potential. This momentary decline terminates in a long flat plateau representing a flat discharge curve extending for about 70%–90% of the useful life of the cells of the present invention. The particular characteristic of a long, flat discharge curve enables the cells of the present invention to be operated at virtually the same substantial potential (eg. about 3 volts) for essentially their entire useful life.

DESCRIPTION OF SPECIFIC EMBODIMENTS

The following Examples are given to enable those skilled in this art to more clearly understand and practice the present invention. They should not be considered as a limitation upon the scope of the invention, but merely as being illustrative and representative thereof.

The cathodes are constructed by pressing a blend of 80–90% of the active material and 10–20% of conducting additive and sufficient binder generally polytetrafluoroethylene or polyethylene, onto an expanded copper or nickel screen, at 2000 psig for 3 minutes. The cathode is then heat sealed into a nonwoven polypropylene envelope and dried in a vacuum oven before being transferred to an argon glove box for assembly into a cell. The cathode polypropylene assembly is enveloped on both sides with 15 mil thick lithium foil to which a small piece of expanded nickel screen is pressed to accomodate the terminals. The surface of the electrodes in these cells is 28 cm². The electrodes are placed in polyethylene or polytetrafluoroethylene cases of various sizes and adapted to contain 8 ml. to 25 ml. of electrolyte solution.

Open circuit voltage, discharge characteristics and other cell parameters are obtained with the cells in the glove box since the cells are not sealed but only covered with a tight fitting cap electrically insulated from the anode and cathode. Unless otherwise noted, the cell is discharged at 28mA (i.e: 1mA/cm²) to 0 volts. Energy density data, when given, excludes the weight of the case.

EXAMPLE I

The cathode material is $(C_4F)n$ blended with a polytetrafluoroethylene emulsion. The electrolytic solution is 2.0 M lithium chloride, 2.0 M aluminum trichloride in thionyl chloride. The open circuit potential is 3.82 volts. Upon discharge, the cell voltage is 2.25 volts, but climbs slowly to 2.825 volts. Cell voltage drops to 2.0 volts after 36 hours, and to 0 volts after 45.7 hours. The cell has a cathode utilization efficiency of 362%, an energy density to a 2.0 volt cut-off of 71.5 watt-hours/lb., and an energy density to 0 volts of 78.5 watt-hours/lb.

EXAMPLE II

The cathode material is $(C_4F)n$ blended with carbon and a polytetrafluoroethylene emulsion. The electrolytic solution is 1.0 M lithium chloride, 1.0 M aluminum trichloride, in thionyl chloride. The open circuit potential is 3.62 volts. For the majority of the discharge, the voltage remains flat at 3.25 volts. Cell voltage drops to 3.0 volts after 43.0 hours, and to 0 volts after 47.0 hours. At 50% polarization, the current density is 16 mA/cm². The cell has a cathode utilization efficiency of 276%, an energy density to a 3.0 volt cut-off of 106 watt-hour/lb. and an energy density to 0 volts of 110.5 watt-hour/lb. 96% of the cells capacity can be obtained above 3.0 volts at a 1 mA/cm² discharge rate.

EXAMPLE III

Example I is repeated except the electrolytic solution is 1.0 M lithium chloride, 1.0 M aluminum trichloride in thionyl chloride. The open circuit potential is 3.86 volts. The cell is discharged at 1 mA/cm² for three hours, at 2 mA/cm² for twenty hours, for three hours at 3 mA/cm², and 2 hours at 2 mA/cm². The cell was dismantled, the spent electrolytic solution replaced with fresh electrolytic solution and the electrodes washed with pure thionyl chloride. Upon reassembly, the cell is discharged for 10 hours at 1 mA/cm². The cell has a total cathode utilization efficiency of 350%, and an energy density for the 38 hours of discharge of 115 watt-hours/lb.

EXAMPLE IV

The cathode material is $(C_4F)n$ blended with a polytetrafluoroethylene emulsion. The electrolytic solution is a saturated solution of lithium tetrachloroaluminate in sulfuryl chloride. The open circuit potential is 3.9 volts. When discharged at 0.3 mA/cm$^2$, the voltage drops from 3.75 volts to 3.45 volts in 13.3 hours. The discharge rate is adjusted to 1 mA/cm$^2$ whereupon the cell voltage stabilized at 3.03 volts. Cell voltage drops to 0 volts after 63.3 hours. The cell has a cathode utilization efficiency of 356%, and an energy density to 0 volts of 135 watt-hours/lb.

EXAMPLE V

The cathode material is $(C_4F)n$ blended with carbon black and a polytetrafluoroethylene emulsion. The electrolytic solution is 1.0 M lithium chloride, 1.0 M aluminum trichloride in sulfuryl chloride. The open circuit potential is 3.9 volts. Upon discharge, the cell voltage is steady at 3.66 volts with total discharge time lasting 52.0 hours. The cell has a cathode utilization efficiency of 327%, and an energy density to 0 volts of 135.45 watt-hours/lb.

EXAMPLE VI

In this Example, two cathodes are utilized, one on each side of an intermediate lithium anode. The electrolytic solution is 1.8 M lithium chloride, 2.0 M aluminum trichloride in thionyl chloride. A thick rectangular glass cell holding 15 ml. of the electrolyte is fitted with a single 3 grams lithium anode with a 1.5 grams $(C_4F)n$ and carbon black cathode on one side and a 3 grams cathode of a similar material on the other side. The open circuit potential of each cell is 3.6 volts. Upon discharge against the single anode, at 2 mA/cm$^2$ each in separate circuits, after 17 hours, the cell voltage of the cell having the 1.5 grams cathode drops to 3.3 volts. The discharge rate is increased to 3 mA/cm$^2$ whereupon the cell voltages are 3.2 volts for the cell having the 1.5 gram cathode and 3.45 volts for the cell having the 3.0 gram cathode. After two hours of discharge at 3 mA/cm$^2$, the discharge rate is decreased to 1 mA/cm$^2$ whereupon cell voltages rose to 3.7 volts for the cell having the 3.0 gram cathode and 3.65 volts for the cell having the 1.5 gram cathode. After 90 hours of total discharge, the cathode utilization efficiencies are determined to be 301% for the cell having the 1.5 gram cathode and 150.6% for the cell having the 3.0 gram cathode.

The cell having the 1.5 gram cathode has a total discharge of 107.0 hours. The cell has a cathode utilization efficiency of 347%, and a capacity of 5.76 watt-hours.

The cell having the 3.0 gram cathode has a total discharge of 161.5 hours. The cell has a cathode utilization efficiency of 312% and a capacity of 11.05 watt-hours.

The total energy density for the 2 cell unit is 218 watt-hour/lb.

EXAMPLE VII

The cathode material is an 80% blend of $(C_4F)n$ with 10% graphite and 10% polytetrafluoroethylene emulsion. The electrolytic solution is 1.0 M lithium tetrachlorolaluminate in thionyl chloride. The open circuit voltage is 3.79 volts. Upon discharge, the cell voltage decreases to 2.8 volts in the first minute, then increases to a plateau voltage of 3 volts. Cell voltage drops to 2.0 volts after 44.5 hours, and to 0 volts after 47.0 hours. The cell has a cathode utilization efficiency (to 2 volts) of 260%, and energy density to 2.0 volt cut-off of 94.5 watt-hours/lb.

EXAMPLE VIII

The cathode material is $(C_4F)n$ blended with a polytetrafluoroethylene emulsion. Sodium metal is substituted for the lithium in the anode. The electrolytic solution is 1.0 M sodium chloride and 1.0 M aluminum trichloride in thionyl chloride in the flat nickel cell described in Example XVI below. A glass mat separator is utilized in place of the polypropylene separator. The open circuit potential is 3.78 volts which drops after 1 hour to 3.72 volts. Upon discharge at 1 mA/cm$^2$ the cell voltage drops to 2.0 volts after 6 hours and to 1.1 volts after 8¾ hours. Current density at 50% voltage polarization is 7.5 mA/cm$^2$. The cell is discharged at 1 mA/cm$^2$ for a period of time corresponding to 100% cathode utilization efficiency; further capacity remains.

EXAMPLE IX

The cathode material is $(C_4F)n$ blended with graphite and a polytetrafluoroethylene emulsion. The electrolytic solution is 1.0 M lithium tetrachloroborate in phosphorus oxychloride. The open circuit potential is 3.84 volts. The cell is discharged at 0.040 amps for 13 hours to 0 volts. The cell has a cathode utilization efficiency of 180%.

EXAMPLE X

The cathode material is $(C_4F)n$ blended with paper as a binder. The electrolytic solution is 1.0 M lithium tetrachloroborate in phosphorus oxychloride. The open circuit potential is 3.11 volts. Upon discharge, the cell voltage drops to 2.0 volts after 69 hours, and to 0 volts after 79 hours. The cell has a cathode utilization efficiency of 411%, and an energy density to a 2.0 volt cut-off of 37.8 watt-hours/lb.

EXAMPLE XI

The cathode material is $(C_4F)n$ blended with shredded paper as a binder. The electrolytic solution is 1.0 M lithium tetrachloroborate in phosphorus oxychloride. The open circuit potential is 3.31 volts. Upon discharge for 24 hours at 1 mA/cm$^2$, the voltage plateau is 2.2 volts. After 24 hours the discharge rate is increased to 3 mA/cm$^2$ whereupon the cell voltage decreases from 2.2 volts to 1.7 volts. After 4 hours of discharge at 3 mA/cm$^2$, the discharge rate is decreased to 2 mA/cm$^2$ for 3 hours whereupon the cell voltage drops to 1.65 volts. After an additional 24 hours of discharging, the cell voltage is 0.78 volts. The cell has a cathode utilization efficiency of 392%.

EXAMPLE XII

The cathode material is $(C_4F)n$ blended with graphite and polytetrafluoroethylene emulsion. The electrolytic solution is 1.0 M $LiBCl_4$ in $POCl_3$. The open circuit potential is 2.5 volts. Cell voltage drops to 2.2 volts after about 1 hour, to 2.0 volts after about 70 hours, and to 0 volts after 78 hours. The cell has a cathode utilization efficiency of 470%. Current density at 50% polarization is 4 mA/cm$^2$.

EXAMPLE XIII

The cathode material is 80% $(C_4F)n$ blended with 10% graphite and 10% polytetrafluoroethylene emulsion. The electrolytic solution is 2.5 M $LiAlCl_4$ in $POFCl_2$. The open circuit potential is 3.8 volts, dropping in a few minutes to 3.6 volts, where it stabilizes. Upon discharge, cell voltage drops to 0.1 volts after 90 minutes.

EXAMPLE XIV

The cathode material is $(C_4F)n$ blended with 10% graphite and 10% polytetrafluoroethylene emulsion. The electrolytic solution is 1.0 M $LiBCl_4$ in $POFCl_2$. The open circuit potential is 3.55 volts. Upon discharge, cell voltage decreases to 2.26 volts, decays slowly to 1.5 volts in 22 hours, to 1.0 volts in 24.5 hours, and to 0 volts after 26 hours. The cell has a cathode utilization efficiency of 212%.

EXAMPLE XV

Cells are prepared having a cathode material of $(C_4F)n$ blended with polytetrafluoroethylene. The electrolytic solution is 1 M $BCl_3$ and 0.8 M LiCl in a one-to-one mixture of $POCl_3$ and $SOCl_2$. Open circuit potentials range from 3.90 to 4.05 volts. The cells exhibit flat voltage plateaus at 2.8 – 3.1 volts for 70–90% of their lives when discharged at 1 $mA/cm^2$. Current densities at 2 volts range between 3–4 $mA/cm^2$. Typical cathode utilization efficiencies range from 275% to 334%. In a typical cell, upon discharge cell voltage drops rapidly to 3.0 volts and is about 2.9 volts after 30 hours, 2.7 volts after 35 hours, 2.0 volts after 40 hours, and drops to 0 volts after 43 hours. Typical energy densities to 0 volts range from 88 to 102 watt-hours/lb. Similar results are attained with cells using 1 M $LiBCl_4$ solutions in a similar mixture of $POCl_3$ and $SOCl_2$.

EXAMPLE XVI

Example XV is repeated except cell construction is as follows:

The $(C_4F)n$ — polytetrafluoroethylene blend is pressed into a 10 $cm^2$ circular recess in a nickel plate used to electrically support the cathode and dried in a vacuum oven kept below 100°C to avoid decomposition of the $(C_4F)n$. A 10 $cm^2$ circular disc of 0.022 inch lithium ribbon is pressed into a circular ridge on the piece of nickel that serves to electrically support the lithium anode material. The electrodes are separated by two discs of 0.010 inch nonwoven polypropylene, wetted with 1 ml. of an electrolytic solution of 0.8 M LiCl and 1 M $BCl_3$ is a 55% $SOCl_2$ — 45% $POCl_3$ mixture. The nickel discs, separated by an annular ring of 0.005 inch polytetrafluoroethylene, are clamped together, and sealed with Viton O-ring in a flat nickel case. Open circuit potential is 3.05 volts. When discharged at 10 mA (1 $mA/cm^2$) voltage dropped less than 0.06 volts while 80% of capacity was discharged. Energy density to a 3.0 volts cut-off is 126 watt-hours/lb., and energy density to 0 volts is 167 watt-hours/lb. Cathode utilization efficiency is 201%.

EXAMPLE XVII

Example XVI is repeated except a 2 M $LiAlCl_4$ in $SOCl_2$ electrolytic solution is utilized. The open circuit potential is 3.75 volts. At 50% polarization (i.e: about 1.9 volts), current density is 15 $mA/cm^2$. Upon discharge at 1 $mA/cm^2$ (i.e.: 10 mA) cell voltage drops to slightly about 3.0 volts where it remains for about 40 hours, after which it drops off sharply to 0 volts after 45 hours. An energy density of 218 watt-hours/lb. is attained, of which 200 watt-hours/lb. are delivered above 2.7 volts.

EXAMPLE XVIII

The cathode material is $(C_4F)n$ blended with graphite and polytetrafluoroethylene emulsion. The electrolytic solution is prepared by adding LiF to a solution of $POCl_3$ through which $BF_3$ had been bubbled. The open circuit potential is 3.43 volts. Upon discharge at 1 $mA/cm^2$ cell voltage drops from 1.9 volts to 0 volts in 23.2 hours. Cathode utilization efficiency is 221%.

EXAMPLE XIX

The cathode material is $(C_4F)n$ blended with a polytetrafluoroethylene emulsion. The electrolytic solution is 0.8 M LiCl, 1.0 M $AlCl_3$ in a 50:50 volume mixture of $POCl_3$ and $SOCl_2$. The open circuit potential is 3.98 volts. When discharged at 1 $mA/cm^2$ the cell lasts for 44.6 hours. Cathode utilization efficiency is 253%.

EXAMPLE XX

The cathode material is $(C_4F)n$ blended with a polytetrafluoroethylene emulsion. The electrolytic solution in a 50:50 volume mixture of (a) a saturated solution of $LiBF_4$ in $POCl_3$, with a slight excess of $LiBF_4$, and (b) 0.8 M LiCl, 1.0 M $BCl_3$ in a 50:50 mixture of $POCl_3$ and $SOCl_2$. When discharged at 1 $mA/cm^2$, the cell lasts for 35.6 hours. Cathode utilization efficiency is 234%.

EXAMPLE XXI

The cathode material is $(C_4F)n$ in a glass cell. The electrolytic solution is 2.0 M $LiBF_4$ in $POFCl_2$. Open circuit potential is 3.127 volts. When discharged at 1 $mA/cm^2$, the cell lasts for 26.0 hours. Cathode utilization efficiency is 246%.

EXAMPLE XXII

The cathode material is a 6.0 gram blend of $(C_4F)n$ with carbon black and a polytetrafluoroethylene emulsion. The electrolytic solution is 1.0 M $LiAlCl_4$ in $SO_2Cl_2$. The cathode is placed between the lithium foil and rolled up into a tight spiral and placed into a glass cell. Open circuit potential is 3.93 volts. When discharged at 1 $mA/cm^2$ (i.e.: 160 mA), voltage decreases to 3.63 volts, then increases to 3.69 volts and remains steady. Cell voltage went below 3 volts after 36 hours, 2 volts after 38.9 hours, and to 0 volts after 40.2 hours. Cathode utilization efficiency is 301%, and energy density to 0 volts is 255 watt-hours/lb.

EXAMPLE XXIII

Example XXII is repeated except the electrolytic solution is 1.8 M $LiAlCl_4$ in $SOCl_2$. The cathode contains 5.70 grams of the $(C_4F)n$ blend. Open circuit voltage is 3.593 volts which increases to 3.62 volts after 15 minutes. When discharged at 1 $mA/cm^2$, voltage decreases to 3.241 volts. Cell voltage went below 3 volts after 37.5 hours, 2 volts after 38.5 hours and to 0 volts after 40 hours. Cathode utilization efficiency is 329%, and energy density to 0 volts is 230 watt-hours/lb.

EXAMPLE XXIV

The cathode material is $(C_2F)n$ blended with 15% carbon black and 10% polytetrafluoroethylene emulsion. The electrolytic solution is 1.8 M LiCl, 1.8 M $AlCl_3$ in $SOCl_2$. The open circuit potential is 3.6 volts. Upon discharge at 1 mA/cm², voltage drops to 3.0 volts after 38 hours, to 1.5 volts after 50 hours, and to 0.38 volts after 69 hours. Cathode utilization efficiency to 0.38 volts is 276%, and energy density to 1.5 volts is 113.5 watt-hours/lb.

EXAMPLE XXV

The cathode material is the blend of Example XXIV, and the electrolytic solution is 1.0 M LiCl, 1.0 M $AlCl_3$ in $SO_2Cl_2$. Open circuit potential is 3.9 volts. Cathode utilization efficiency is 237.5% and energy density to 0 volts is 200 watt-hours/lb.

EXAMPLE XXVI

The cathode material is $(C_{1.43}F)n$ blended with polytetrafluoroethylene powder. The electrolytic solution is 0.8 M LiCl, 1.0 M $BCl_3$ in a 50:50 volume mixture of $POCl_3$ and $SOCl_2$. Open circuit potential is 3.8 volts. After discharge at 1 mA/cm² for 49.5 hours, the discharge is stopped when cell voltage drops to 0.05 volts. When discharge is resumed, voltage drops from 2.7 volts to 0 volts in 10.5 hours. Overall cathode utilization efficiency is 142%.

EXAMPLE XXVII

The cathode material is a blend of $(C_4F)n$ and a polytetrafluoroethylene emulsion, and the electrolytic solution is $LiBCl_4$ in a mixture of $SOCl_2$ and $POCl_3$. The cell is left standing after assembly for one week. Upon discharge at 1 mA/cm² cell voltage after 23.5 hours is 2.68 volts. The cell is cooled to −40°C, whereupon cell voltage decreases to 2.24 volts. Upon discharge at about −40°C for 4 hours, cell voltage remains at 2.24 volts. When the cell is permitted to return to room temperature, cell voltage is 2.58 volts. After 80 hours, cell voltage drops to 0.13 volts. Cathode utilization efficiency is 250%.

EXAMPLE XXVIII

The cathode material is a 3.65 gram blend of 83% $(C_4F)n$, 9% carbon black, and 8% polytetrafluoroethylene emulsion. The electrolytic solution is 1.8 M $LiAlCl_4$ in $SOCl_2$. Open circuit potential is 3.65 volts. When discharged at 160 mA, the cell exhibits a flat plateau at 3.3 volts dropping to 0 volts after 27 hours. Cathode utilization efficiency is 347% and energy density is 162 watt-hours/lb.

The procedure for making the flexible cathodes of Examples XXII, XXIII and XXVIII is to mix 10.25 gm $(C_4F)n$ and 1.13 gm carbon black in a blender, add 1 gm Teflon emulsion and blend. This mixture is spread over both sides of a piece of Ni screen and pressed at 10,000 psi for one minute before sealing in nonwoven polypropylene. The cathode is rolled up with lithium foil and placed into a 1 inch diameter glass tube to which the electrolyte is added.

EXAMPLE XXIX

Example II is repeated except the electrolyte solution is 1 M lithium chloride, 1 M antimony pentachloride in thionyl chloride. The open circuit potential is 3.65 volts. The cell is discharged at 1 mA/cm² starting at 3.25 volts, dropping to 3.0 volts after 24 hours and to 0 volts after 26 hours. The cell has a cathode utilization efficiency of 140%.

The solutes utilized in the cells of the above Examples are considered representative of Lewis acid solutes or solutes (e.g., lithium tetrachloroaluminate) which will yield a Lewis acid upon dissociation. Additional solutes suitable for use in this invention are set forth above, and no reason is seen why such solutes, especially of the Lewis acid or Lewis acid-yielding types, should not be suitable for obtaining the unexpectedly high coulombic cathode utilization efficiencies described herein.

Of the electrochemical cells described above, those having a lithium anode and an electrolytic solution of 1–2 M lithium tetrachloroaluminate in thionyl chloride, sulfuryl chloride, or mixtures thereof, are presently preferred. Such cells exhibit the flattest discharge curves, the highest energy densities and the highest power outputs of the cells described in this application.

The electrochemical cells of this invention exclude sulfur dioxide therefrom, whether such material is considered as the active cathode material (i.e., the cathode depolarizer) or as a solvent or cosolvent material. Thus, this feature further distinguishes the cells of this invention from (a) the cells described in Maricle et al, U.S. Pat. No. 3,567,515, all of which require the use of sulfur dioxide as the oxidant material, and (b) the cells described in U.S. Pat. No. Re. 27,835 which, in addition to using sulfur dioxide and an organic liquid as a mixed solvent system, require the use of a further cathode depolarizer dissolved in the mixed solvent system. In addition, the cells as described above do not make use of other oxidant materials or cathode depolarizers dissolved in the solvents or mixed solvent systems described herein. Yet, as described, the cells of this invention have coulombic cathode utilization efficiencies greater than that which would be expected from a theoretical consideration of the expected reduction of the active cathode material.

While the present invention has been described with reference to specific embodiments thereof, it should be understood by those skilled in this art that various changes may be made and equivalents may be substituted without departing from the true spirit and scope of the invention. In addition, many modifications can be made to adapt a particular situation, material or composition of matter, process, process step or steps, or then present objective to the spirit of this invention without departing from its essential teachings.

What is claimed is:

1. An electrochemical cell comprising an alkali metal anode; a catalytic cathode material including at least in part an intercalation compound of graphite and fluorine represented by the general formula $(C_4F)_n$ wherein n refers to the presence of an indeterminately large number of recurring $(C_4F)$ groups in the intercalation compound; and an electrolyte consisting essentially of an inorganic solvent material selected from the group consisting of phosphorus oxychloride, monofluorophosphoryl dichloride, thionyl chloride, sulfuryl chloride and mixtures thereof, and a solute dissolved in said inorganic solvent material, said solute including a Lewis acid or a material yielding a Lewis acid by dissociation in said inorganic solvent material; said cell being characterized by having a coulombic cathode utilization of at least about 142% of the theoretical which would be attained by reduction of the cathode material to elemental carbon and fluoride ions.

2. The electrochemical cell of claim 1 wherein said anode material is lithium.

3. The electrochemical cell of claim 1 wherein said anode material is sodium.

4. The electrochemical cell of claim 1 wherein said inorganic solvent material is phosphorus oxychloride.

5. The electrochemical cell of claim 1 wherein said inorganic solvent is monofluorophosphoryl dichloride.

6. The electrochemical cell of claim 1 wherein said inorganic solvent material is thionyl chloride.

7. The electrochemical cell of claim 1 wherein said inorganic solvent material is sulfuryl chloride.

8. The electrochemical cell of claim 1 wherein said inorganic solvent material comprises a mixture of phosphorus oxychloride and thionyl chloride.

9. The electrochemical cell of claim 1 wherein said solute includes a Lewis acid.

10. The electrochemical cell of claim 1 wherein said solute includes an excess of a Lewis acid.

11. The electrochemical cell of claim 9 further including an alkali metal halide.

12. The electrochemical cell of claim 11 wherein said alkali metal halide is lithium chloride.

13. The electrochemical cell of claim 11 wherein said solute includes an excess of said Lewis acid.

14. The electrochemical cell of claim 1 wherein said solute includes a Lewis acid selected from the group consisting of aluminum chloride, boron fluoride, boron chloride, tin chloride, antimony chloride, antimony fluoride, titanium chloride, aluminum bromide, phosphorus pentafluoride, phosphorus pentachloride, arsenic pentafluoride, arsenic pentachloride, zinc chloride, and zirconium chloride.

15. The electrochemical cell of claim 1 wherein said solute comprises a solute material yielding a Lewis acid by dissociation in said solvent material.

16. The electrochemical cell of claim 15 wherein said Lewis acid yielding solute material comprises lithium tetrachloroaluminate, lithium tetrachloroborate, lithium tetrabromoaluminate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate and lithium hexachlorotitanate.

17. The electrochemical cell of claim 1 wherein said cell is further characterized by having a voltage discharge plateau for about 70% to about 90% of the total discharge time.

18. The electrochemical cell of claim 1 wherein said active cathode material further includes graphite or carbon black in admixture with said $(C_4F)_n$ intercalation compound.

19. The electrochemical cell of claim 1 wherein said active cathode material is a mixture of $(C_4F)_n$ and $(CF)_n$ to give a representative formula $(C_xF)_n$, where X is greater than 1 and less than 4.

20. The electrochemical cell of claim 1 wherein said cathode material further includes carbon.

21. The electrochemical cell of claim 1 wherein said anode is lithium, said solvent material is thionyl chloride, and said solute is lithium tetrachloroaluminate.

22. The electrochemical cell of claim 1 wherein said anode is lithium, said solvent material is sulfuryl chloride, and said solute is lithium tetrachloroaluminate.

23. The electrochemical cell of claim 1 wherein inorganic solvent comprises a mixture of phosphorus oxychloride and sulfuryl chloride.

24. The electrochemical cell of claim 1 wherein inorganic solvent comprises a mixture of thionyl chloride and sulfuryl chloride.

* * * * *